United States Patent Office 3,027,341
Patented Mar. 27, 1962

3,027,341
EPOXY MODIFIED WATER SOLUBLE ALKYD RESIN
John Balding Boucher and George Willard Bussell, Dearborn, Mich., assignors to Rinshed-Mason Company, Detroit, Mich., a corporation of Michigan
No Drawing. Filed Apr. 28, 1958, Ser. No. 731,119
17 Claims. (Cl. 260—22)

This invention relates to a modified alkyd resin. More particularly, this invention relates to a relatively stable, water soluble epoxy modified alkyd resin which will become hydrophobic upon curing.

Alkyd resins are used extensively as protective and decorative coatings and as a vehicle in automotive and industrial finishes, water-thinned paints, lacquers, enamels and as a grinding vehicle. They are also used in adhesives, inks and in various compositions containing rubber. This wide usage has resulted from the various desirable properties of the resin, such as good color retention, toughness, heat resistance, resistance to weather exposure, flexibility and ease of application.

However, alkyd resins are not soluble in water and their use has been restricted accordingly. It has been thought desirable to provide an alkyd resin which would form a stable solution or mixture with water for use in applications in which water forms a portion of the product. A further desirable characteristic of a water soluble resin is that it become hydrophobic upon curing, that is, its resistance to water absorption be substantially increased after being cured. We have described such a resin in our copending application Serial No. 729,528, filed April 21, 1958, now abandoned.

By the present invention we have provided such a resin which is modified by an epoxy resin and a monobasic acid to yield improved film-forming qualities of toughness and adhesion.

It is, therefore, an object of this invention to provide an epoxy modified alkyd resin which will dissolve in water and form a stable mixture therewith.

Another object is to provide a water soluble alkyd resin which upon curing will become hydrophobic.

A further object of the invention is to provide a modified alkyd resin having improved film-forming properties over unmodified alkyd resins.

A further object is to provide a modified alkyd resin which is tougher and has improved adhesion qualities as against an unmodified alkyd resin.

Another object is to provide a water soluble alkyd resin which will form a mixture with water that will maintain its stability during cycles of freezing and thawing.

A still further object of this invention is the provision of a modified alkyd resin which may be dissolved in a water system to form a stable mixture without the complicated use of surfactants, dispersing agents and the like.

In its broadest aspect this invention comprises an alkyd resin first modified by an epoxy resin and a monobasic acid and subsequently treated with a base whereby an alkyd is produced that is water soluble, becomes hydrophobic upon curing, and has improved properties of adhesion and toughness.

In our previously mentioned copending application we have disclosed a method of preparing a water soluble alkyd resin. Briefly, we have discovered that alkyd resins having high acid numbers may be made water soluble by reaction with a base. Alkyd resins are usually prepared with acid numbers below 15. If the alkyd resin is prepared with an acid number of from 25 to 80, preferably from 30 to 70, it will become water soluble when treated with a selected base.

Alkyd resins ordinarily are prepared by the union of a polybasic acid or anhydride with a polyhydric alcohol such as a glycol or glycerine. The process may simply comprise the admixture of the acid and alcohol under conditions of heat whereby the acid and alcohol will react to form an alkyd resin. At the beginning of the reaction the acid value is relatively high i.e. above 80. As the reaction proceeds, the acid number falls until the reaction reaches completion when the acid number is at its minimum value i.e. below 15. If the reaction is stopped while the acid value is between 25 and 80, the resultant high acid value alkyd resin will become water soluble upon treatment with a base.

Such high acid value alkyds exhibit properties similar to low acid value alkyds. However, there is a relationship between the acid number and stability and solubility. If the acid number is too high, i.e. above 80, the alkyd resin tends to be unstable and can't be stored for periods sufficient for commercial use. Such high acid value resins will, however, become water soluble when treated with a base. If the acid value is too low, i.e. below 25, the resin is very difficult to solubilize by treatment with a base.

According to the present invention the alkyd resin is further modified by an epoxy resin and a monobasic acid to improve its film-forming qualities. We have discovered that if the components of an alkyd resin i.e. a polybasic acid and polyhydric alcohol, are added to a partially reacted mixture of an epoxy resin and a monobasic acid, it is possible to inter-react all of the ingredients by the simple application of heat to form an epoxy modified alkyd resin.

However, if the epoxy resin is combined with the alkyd resin without first itself being modified, the resultant epoxy modified alkyd resin will not have a viscosity range low enough to be suitable for use according to the present invention. This undesirable result is due to the high functionality characteristics of epoxy and alkyd resins, functionality being the term applied to the number of reactive groups theoretically inherent to a material. It has been found that if the epoxy resin is first defunctionalized it may be combined with an alkyd resin to form the desired end product. Epoxy resins may be defunctionalized by forming a partial ester of the resin with a monobasic acid through both the epoxide linkages and the hydroxyl groups of the epoxy resin.

The preparation of the epoxy modified alkyd resin of the present invention may be carried out in three basic steps. The first step comprises admixing the epoxy resin with the monobasic acid and heating until the mixture is partially reacted and reduced in functionality. The ingredients of the alkyd resin may then be added, preferably the alcohol first, followed by the acid, and heated until the desired acid number is obtained. The acid number of the untreated resin should be in the range of from 25 to 80 based on the undiluted modified resin, and preferably from 30 to 70, in order to insure a stable, water soluble resin. The third step comprises treating the modified alkyd resin with a base to obtain the final water soluble resin.

The alkyd resins suitable for use according to the present invention are the ordinary resins prepared by the union of a polybasic acid or anhydride with a polyhydric alcohol such as a glycol or glycerine. The polybasic acid may be one of the suitable well known polycarboxylic acids used in the preparation of alkyd resins such as phthalic anhydride, sebacic acid, azelaic acid, adipic acid, succinic acid, or maleic acid. However, phthalic anhydride is the preferred acid for use in forming the alkyd resin.

Suitable polyhydric alcohols are glycerine, ethylene glycol and trimethylolpropane (2,2-dihydromethyl-1-butanol). A preferred alcohol is trimethylolethane (2-hydroxymethyl-2-methyl-1,3-propandiol).

The epoxy resins suitable for this invention are based on ethylene oxide or its homologs or derivatives. The repeating unit of the resin probably has the structure

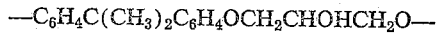

Such compounds can be made by condensation of polyfunctional halohydrin or glyceroldichlorohydrin and polyhydric compounds, particularly the dihydric phenols such as bisphenol A. The epoxide equivalent of the epoxy resins is preferably in the range of from 140–2000. Commercially available epoxy resins (epichlorohydrin bisphenol resins which may be termed glycidyl polyethers of a dihydric phenol) suitable for use in the present invention are the "Epon" resins sold by the Shell Chemical Corporation, New York, N.Y., "Araldite" resins manufactured by the Ciba Company, New York, N.Y., and "Epi-Rez" resins sold by the Jones-Dabney Company, Louisville, Kentucky. Epon resins, including the Epon resins 834, 1001 and 1004 indicated hereinafter in Examples I through VIII, are postulated to have the following structure:

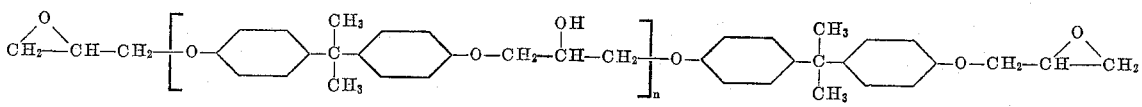

In the foregoing formula, $n$ is an integer of the series 0, 1, 2, 3 . . . . While for any single molecule of the polyether $n$ is an integer, the fact that the obtained polyether is a mixture of compounds causes the determined value for $n$, e.g., from molecular weight measurement, to be an average which is not necessarily zero or a whole number.

The monobasic acid may be used as such or it may be incorporated as a natural oil. Suitable monocarboxylic oils and acids of this class are, for example, linseed fatty acids, soya fatty acids, coconut fatty acids, conjugated linseed acids, pelargonic acid, tung oil, linseed oil, castor oil fatty acids, dehydrated castor oil fatty acids, tall oil fatty acids and linoleic acid.

Other conventional modifications and modifying agents may, of course, be used within the scope of this invention to alter the properties of the resin as desired.

Suitable bases for reaction with the modified alkyd resin are bases of the class of ammonia and its primary, secondary and tertiary aliphatic amines and their derivatives. Examples of suitable amines are dimethylaminoethanol, diethanolamine, diethylenetriamine and triethanolamine. The aliphatic diamines such as ethylene diamine and propylene diamine are also useful. Cyclic amines have also been used with success. Some useful cyclic amines are morpholine, substituted morpholines and piperidine. The preferred amines are triethylamine and dimethylaminoethanol.

One of the preferred methods of preparing the water soluble alkyd resin is to admix the epoxy resin with the monobasic acid and partially react the mixture by means of heat usually at a temperature above 170° C. This temperature should be maintained until the epoxy resin has been defunctionalized. Functionality is related to the acid number. Consequently, acid number measurements will indicate when the reaction has proceeded to the desired extent. The polyhydric alcohol and polybasic acid may then be added whereby the epoxy resin, acids and alcohol will react chemically to form the epoxy modified alkyd resin. The reaction is continued by the maintenance of heat until the desired acid number is obtained, which as previously mentioned is in the range of from 25 to 80. After the desired acid value has been obtained the epoxy modified alkyd resin is treated with a base to make it water soluble. The base is preferably first dissolved in water and added to the resin with constant agitation.

The resultant resin will dissolve in water in amounts of over 50%. Such mixtures will remain stable for long periods, whether stored as such or incorporated into a composition such as a sound deadener or a water-thinned paint. There is some question as to whether the modified resin forms a true solution with water or forms some other mixture, such as a colloidal suspension or a dispersion. Therefore, while it is believed that a solution is formed, it is not intended that the invention be restricted to the exact chemical definition of that term.

The quantities of the epoxy and alkyd resins and the base used to prepare the modified alkyd resin will vary over a wide range according to the characteristics of the particular constituents being used and may easily be determined by one skilled in the art. The polybasic acid content of the alkyd resin can range from 15 to 45%, preferably from 20 to 40%, of the total weight of the alkyd resin, the monobasic acid content may range from 15 to 55%, preferably from 20 to 45%, with the remainder being the polyhydric alcohol. The epoxy resin may be in the range of from 1 to 25% of the total weight of the modified resin. The amount of solubilizing base used is that sufficient to neutralize or make alkaline the modified resin whereby the modified resin has a pH value of 6 or above. For improved stability and ease of solubility it is recommended that the pH value be between 6.8 and 9. The resin will be water soluble if the pH is above 9 or below 6.8. However, pH values of from 6 to 11 are recommended as a commercially practicable range. If the pH is above about 11 the resin will not become as water resistant when cured. A further practical commercial factor is that when the pH is increased to higher values by means of the solubilizing base, an excess of base is used. This excess serves as a solvent whereas it is intended to use water as an inexpensive solvent for the resin.

Some examples of modified alkyd resins prepared according to the present invention are as follows:

*Example I*

| | Parts by weight | |
|---|---|---|
| Epoxy resin | 160 | |
| Linseed fatty acids | 525 | Resin #1 |
| Trimethylolethane | 400 | |
| Phthalic anhydride | 400 | |
| Resin #1 | 1500 | |
| Dimethylaminoethanol | 161 | |
| Water | 1339 | |

The epoxy resin, having an epoxide equivalent of from 870 to 1025 ("Epon Resin 1004" produced by the Shell Chemical Corp.), and linseed fatty acids were charged in a three necked flask equipped with an agitator, thermometer, inert gas (carbon dioxide) and a heating mantle. The mixture was heated to 220° C. and held at this temperature until an acid value of 85 was obtained. At this point the trimethylolethane was added and caused the temperature to drop. During a period of 30 minutes the temperature was raised to 200° C. and then the phthalic anhydride was added. The temperature was then raised to 215° C. and held until the epoxy modified alkyl resin was completely formed and registered an acid value reading of 58. The resin was then removed from the flask and cooled to 90° C. when the dimethylaminoethanol dissolved in the water, was added to 1500 parts of the resin with stirring. The resultant water soluble modified alkyd resin was clear and had a pH of 9.

In the Examples II–VI that follow, the equipment used in preparing the alkyd resin was substantially the same as that used in Example I.

Example II

| | Parts by weight | |
|---|---|---|
| Epoxy resin | 320 | |
| Linseed fatty acids | 470 | Resin #2 |
| Trimethylolethane | 355 | |
| Phthalic anhydride | 455 | |
| Resin #2 | 1500 | |
| Dimethylaminoethanol | 161 | |
| Water | 1339 | |

The epoxy resin, having an epoxide equivalent of from 225 to 290 ("Epon Resin 834," produced by the Shell Chemical Corp.), and the linseed fatty acids were charged into the flask, heated to 210° C. and held at this temperature until an acid number of 78 was obtained. At this point the trimethylolethane was added and the temperature was again brought up to 210° C. over a period of fifty minutes at which time the phthalic acid was added. The temperature was again raised to 210° C. and held there until the modified alkyd resin formed and its acid value reached 56. The resin was then removed from the flask and allowed to cool to 95° C. The dimethylaminoethanol was then added with agitation directly to 1500 parts of the resin. The resultant modified resin was then dissolved in the water. The water solution was clear and had a pH of 8.9.

Example III

| | Parts by weight | |
|---|---|---|
| Epoxy resin | 160 | |
| Soya fatty acids | 525 | Resin #3 |
| Trimethylolethane | 400 | |
| Phthalic anhydride | 515 | |
| Resin #3 | 100 | |
| Dimethylaminoethanol | 10 | |
| Isopropyl alcohol | 10 | |
| Butyl "Cellosolve" (ethylene glycol monobutyl ether) | 10 | |
| Water | 90 | |

The epoxy resin, having an epoxide equivalent of from 450 to 525 ("Epon Resin 1001"), and soya fatty acids were reacted at 220° C. until an acid value of 88 was reached whereat the mixture was cooled to 185° C. The trimethylolethane was added and the mixture reacted for one hour at 215° C. The contents of the flask were then cooled to 185° C. and the phthalic acid was added and reacted at 220° C. until an acid value of 26.5 was reached whereat the alkyd resin was removed from the flask and cooled. The dimethylaminoethanol, isopropyl alcohol and butyl "Cellosolve," all dissolved in the water, were added to the resin at 80° C. resulting in a clear water solution of the epoxy modified alkyd resin.

Example IV

| | Parts by weight | |
|---|---|---|
| Epoxy resin | 160 | |
| Linseed fatty acids | 116 | |
| Tung oil acids | 130 | Resin #4 |
| Trimethylolethane | 400 | |
| Phthalic anhydride | 515 | |
| Resin #4 | 100 | |
| Butyl "Cellosolve" (ethylene glycol monobutyl ether) | 10 | |
| Triethylamine | 10 | |
| Water | 90 | |

The epoxy resin (Epon Resin 1001), linseed fatty acids and tung oil acids were reacted at 208° C. until an acid value of 89 was reached whereat the partial ester was cooled to 185° C. The trimethylolethane was then added and the mixture reacted for one hour at 208° C. After again cooling to 185° C., the phthalic anhydride was added and the mixture reacted at 208–210° C. until an acid value of 57 was reached. The alkyd was then removed from the flask and cooled to 85° C. At this temperature, the butyl "Cellosolve" and triethylamine, dissolved in the water were added with stirring resulting in a clear water solution of the epoxy modified alkyd resin.

Example V

| | Parts by weight | |
|---|---|---|
| Epoxy resin | 160 | |
| Linseed fatty acids | 525 | Resin #5 |
| Glycerine | 306 | |
| Phthalic anhydride | 515 | |
| Resin #5 | 1500 | |
| Dimethylaminoethanol | 161 | |
| Water | 1339 | |

The epoxy resin ("Epon Resin 1001" produced by the Shell Chemical Corp.) and linseed fatty acids were heated to 220° C. and held at this temperature until an acid value of 85 was obtained. At this point the glycerine was added and caused the temperature to drop. During a period of 30 minutes the temperature was raised to 200° C. and then the phthalic anhydride was added. The temperature was then raised to 215° C. and held until the epoxy modified alkyd resin was completely formed and registered an acid value reading of 58. The resin was then removed from the flask and cooled to 90° C. when the dimethylaminoethanol, dissolved in the water, was added to 1500 parts of the resin with stirring. The resultant water soluble modified alkyd resin was clear and had a pH of 9.

Example VI

| | Parts by weight | |
|---|---|---|
| Epoxy resin | 160 | |
| Linseed fatty acids | 525 | Resin #6 |
| Trimethylolpropane | 445 | |
| Phthalic anhydride | 515 | |
| Resin #6 | 1500 | |
| Dimethylaminoethanol | 161 | |
| Water | 1339 | |

The epoxy resin ("Epon Resin 1001" produced by the Shell Chemical Corp.) and linseed fatty acids were heated to 220° C. and held at this temperature until an acid value of 85 was obtained. At this point the trimethylolpropane was added and caused the temperature to drop. During a period of 30 minutes the temperature was raised to 200° C. and then the phthalic anhydride was added. The temperature was then raised to 215° C. and held until the epoxy modified alkyd resin was completely formed and registered an acid value reading of 58. The resin was then removed from the flask and cooled to 90° C. when the dimethylaminoethanol, dissolved in the water, was added to 1500 parts of the resin with stirring. The resultant water soluble modified alkyd resin was clear and had a pH of 9.

Example VII

| | Parts by weight | |
|---|---|---|
| Epoxy resin | 160 | |
| Linseed fatty acids | 525 | Resin #7 |
| Trimethylolethane | 400 | |
| Phthalic anhydride | 515 | |
| Resin #7 | 1500 | |
| Dimethylaminoethanol | 161 | |
| Water | 13339 | |

The epoxy resin ("Epon Resin 1001" produced by the Shell Chemical Corp.) and linseed fatty acids were charged in a three necked flask equipped with an agitator, thermometer, inert gas (carbon dioxide) and a heating mantle. The mixture was heated to 220° C. and held at this temperature until an acid value of 85 was obtained. At this point the trimethylolethane was added and caused the temperature to drop. During a period of 30 minutes the temperature was raised to 200° C. and then the phthalic anhydride was added. The temperature was then raised to 215° C. and held until the epoxy modified alkyd resin was completely formed and registered an acid value reading of 58. The resin was then removed from the flask and cooled to 90° C. when the dimethylaminoethanol dissolved in the water, was added to 1500 parts of the resin with stirring. The resultant water soluble modified alkyd resin was clear and had a pH of 9.

*Example VIII*

|  | Parts by weight |  |
|---|---|---|
| Epoxy resin | 320 |  |
| Linseed fatty acids | 470 | Resin #8 |
| Trimethylolethane | 355 |  |
| Phthalic anhydride | 455 |  |
| Resin #8 | 1500 |  |
| Dimethylaminoethanol | 161 |  |
| Water | 1339 |  |

The epoxy resin ("Epon Resin 1001", produced by the Shell Chemical Corp.) and the linseed fatty acids were charged into the flask, heated to 210° C. and held at this temperature until an acid number of 78 was obtained. At this point the trimethylolethane was added and the temperature was again brought up to 210° C. over a period of fifty minutes at which time the phthalic acid was added. The temperature was again raised to 210° C. and held there until the modified alkyd resin formed and its acid value reached 56. The resin was then removed from the flask and allowed to cool to 95° C. The dimethylaminoethanol was then added with agitation directly to 1500 parts of the resin. The resultant modified resin was then dissolved in the water. The water solution was clear and had a pH of 8.9.

When the epoxy modified alkyd resin is treated with certain of the useful solubilizing bases as in the third step it will form a turbid or opaque water solution. This does not affect the stability or usefulness of the solution but it may be objectionable from the visual standpoint. Such solutions may be made clear if desired by the addition of a small amount of a water soluble organic solvent, as in Examples III and IV, such as isopropyl alcohol, diacetone alcohol, or butyl "Cellosolve", a trademarked product comprising ethylene glycol monobutyl ether, sold by Union Carbide and Carbon Corporation, New York, New York. The solvents may be added in amounts of from 1 to 20% by weight based on the alkyd resin solids. The amount added will vary depending on factors such as the solubilizing base used and the acid number of the particular modified alkyd resin at hand. Bases which will produce such turbid or opaque solutions when used to treat the modified alkyd resin are ammonia, diethylamine, triethylamine, N-methyl morpholine, morpholine and 2 amino-2 methyl propanol-1.

An alkyd resin modified according to the present invention will become hydrophobic upon being cured with heat, as by baking. This property is advantageous and a necessity in some instances, for instance where the modified resin is to form a portion of a permanent film that is to be exposed to water or water vapor. The epoxy modified alkyd will also exhibit improved adhesion and toughness when used alone or when incorporated into mixtures of film-forming ingredients.

Having thus described our invention, we claim:

1. A resinous water-soluble composition comprising the reaction products of (A) an alkyd resin having an acid number of from 25 to 70 obtained by reacting (a) the product obtained by partially reacting a glycidyl polyether of a dihydric phenol with a monocarboxylic fatty acid of a glyceride oil to form a partial ester with (b) a polycarboxylic acid and a polyhydric alcohol, and (B) an aliphatic amine.

2. A resin as claimed in claim 1 and further characterized in that said agent is dimethylaminoethanol.

3. A resin as claimed in claim 1 and further characterized in that said agent is triethylamine.

4. A resin as claimed in claim 1 and further characterized in that the polycarboxylic acid is phthalic acid and the polyhydric alcohol is trimethylolethane.

5. A resin as claimed in claim 1 and further characterized in that it has a pH value above 6.

6. A resin as claimed in claim 1 and further characterized in that it has a pH value above 6.8.

7. A resin as claimed in claim 1 and further characterized in that the glycidyl polyether of a dihydric phenol has an epoxide equivalent in the range of from 140 to 2,000.

8. A resinous water-soluble composition comprising the reaction products of (A) an alkyd resin having an acid number of from 25 to 70 obtained by reacting (a) the product obtained by partially reacting a glycidyl polyether of a dihydric phenol with a monocarboxylic fatty acid of a glyceride oil to form a partial ester with (b) a polycarboxylic acid and a polyhydric alcohol, and (B) an agent selected from the group consisting of ammonia and its primary, secondary and tertiary aliphatic amines.

9. The process of modifying a resin to make it water-soluble comprising first forming an alkyd resin by partially reacting a mixture of a glycidyl polyether of a dihydric phenol and a monocarboxylic fatty acid of a glyceride oil to the point of forming a partial ester of the polyether; then reacting said partially reacted substance with polycarboxylic acid and a polyhydric alcohol until an alkyd resin forms having an acid number of from 25 to 80; and thereafter reacting said resin with an aliphatic amine to obtain a modified resin having a pH value above 6.

10. The process of modifying a resin to make it water-soluble comprising the first forming an alkyd resin by partially reacting a mixture of a glycidyl polyether of a dihydric phenol and a monocarboxylic fatty acid of a glyceride oil to the point of forming a partial ester of the polyether; then reacting said partially reacted substance with polycarboxylic acid and a polyhydric alcohol until an alkyd resin forms having an acid number of from 25 to 80; and thereafter reacting said resin with an agent selected from the group consisting of ammonia and its primary, secondary and tertiary aliphatic amines to obtain a resin having a pH value above 6.

11. The process of modifying a resin to make it water-soluble comprising first forming an alkyd resin by partially reacting a mixture of a glycidyl polyether of a dihydric phenol and a monocarboxylic fatty acid of a glyceride oil to the point of forming a partial ester of the polyether; then reacting said partially reacted substance with a polycarboxylic acid and a polyhydric alcohol until a modified alkyd resin forms having an acid number of from 25 to 80; said polyether being present in an amount of from 1 to 25 percent based on the total weight of the resin; and then reacting the resin with an agent selected from the group consisting of ammonia and its primary, secondary and tertiary aliphatic amines to obtain a modified resin having a pH value above 6.

12. A process as claimed in claim 11 and further characterized in that the alkyd resin mixture has an acid number of from 30 to 70 before it is reacted with said agent.

13. A process as claimed in claim 11 and further characterized in that the agent is dimethylaminoethanol.

14. A process as claimed in claim 11 and further characterized in that the agent is triethylamine.

15. The process as claimed in claim 11 and further characterized in that the polycarboxylic acid is phthalic acid.

16. The process as claimed in claim 11 and further characterized in that the polycarboxylic acid is phthalic acid and the polyhydric alcohol is trimethylolethane.

17. The process as claimed in claim 11 and further characterized in that the modified resin has a pH value above 6.8.

References Cited in the file of this patent

UNITED STATES PATENTS

| | | |
|---|---|---|
| 2,691,004 | Doyle | Oct. 5, 1954 |
| 2,720,500 | Cody | Oct. 11, 1955 |
| 2,785,383 | Foster | Mar. 12, 1957 |
| 2,852,477 | Greenlee | Sept. 16, 1958 |
| 2,859,199 | Parker | Nov. 4, 1958 |
| 2,871,454 | Langer | Jan. 27, 1959 |
| 2,887,459 | Carmody | May 19, 1959 |
| 2,935,488 | Phillips et al. | May 3, 1960 |

FOREIGN PATENTS

| | | |
|---|---|---|
| 762,764 | Great Britain | Dec. 6, 1956 |
| 786,102 | Great Britain | Nov. 13, 1957 |